United States Patent [19]

Goldstein et al.

[11] 4,147,846
[45] Apr. 3, 1979

[54] ALKOXYSILANE CLUSTER SURFACTANTS FOR RIGID POLYURETHANE FOAM

[75] Inventors: Stephen L. Goldstein; David F. Gavin, both of Cheshire, Conn.

[73] Assignee: Olin Corporation, New Haven, Conn.

[21] Appl. No.: 934,644

[22] Filed: Aug. 17, 1978

[51] Int. Cl.$^2$ .............................................. C08G 18/14
[52] U.S. Cl. ..................................... 521/110; 252/182
[58] Field of Search .......................... 521/110; 252/182

[56] References Cited

U.S. PATENT DOCUMENTS

| 2,630,446 | 3/1953 | Gresham | 260/448.8 R |
| 2,776,307 | 1/1957 | Abbott et al. | 260/448.8 R |
| 2,839,558 | 6/1958 | Kirkpatrick et al. | 260/448.8 R |
| 3,072,582 | 1/1963 | Frost | 521/131 |
| 3,965,136 | 6/1976 | Knollmueller | 260/448.8 A |
| 3,976,675 | 8/1976 | Scott et al. | 260/448.8 R |
| 4,048,084 | 9/1977 | Knollmueller | 252/78.3 |
| 4,077,993 | 3/1978 | Knollmueller | 260/448.8 R |

FOREIGN PATENT DOCUMENTS 705938  3/1965  Canada .................................... 521/131

OTHER PUBLICATIONS

Boudreau, Modern Plastics, Jan. 1967, pp. 133–135, 138, 143, 144, 147, 234, 239 & 240.
Schwarz et al., J. Anorg. Chem., 236, 1950, pp. 15–30.

Primary Examiner—Maurice J. Welsh
Attorney, Agent, or Firm—Robert J. Feltovic; Thomas P. O'Day

[57] ABSTRACT

Described is a process for making rigid polyurethane foam from a reaction formulation including a novel surfactant composition comprising select trialkoxysilanols or alkoxysilane cluster compounds.

26 Claims, No Drawings

ALKOXYSILANE CLUSTER SURFACTANTS FOR RIGID POLYURETHANE FOAM

Surface active agents commonly are used in various polyurethane foam formulations. These agents serve to assist in the blending of the foam-forming reactants and, in particular, exert a significant influence on the resulting foam structure. Choice of surfactant type often varies widely depending on whether the system is being designed for flexible or rigid foam production. Silicone oils and soaps are widely employed in the art (i.e., R. J. Boudreau, Modern Plastics, January, 1967) and usually produce rigid foams with fine cell structure, uniformity and high closed cell content. Rigid foams prepared from formulations including effective surfactants generally feature lower moisture permeability and higher strength properties than when no surfactant is utilized.

Various silicates and polyglycol silicates have been disclosed in the chemical art (i.e., a group of alkyl silicates is described in an article by Schwartz and Kessler, Z. Anorg. Chem., 236, 15; polyglycol silicates are described in U.S. Pat. Nos. 2,630,446, 2,776,307, and 2,839,558). However, the utility of most silicate-based surfactants in the production of polyurethane foam has not been demonstrated. This non-applicability appears to be based on the hydrolytic instability of silicates. One silicate-based surfactant composition which has been found to be particularly useful as a stabilizer in the preparation of polyurethane foams is dislcosed in U.S. Pat. No. 3,976,675 (Scott et al). Silicate esters, silanes and oxysilanes are well known for their utility as functional fluids and many of these compounds have been proposed for use as heat transfer fluids, hydraulic fluids, brake fluids, transmission fluids, and the like.

Now, according to the present invention, novel surfactant compositions for use in rigid polyurethane foam formulations have been found. These surfactants comprise select trialkoxysilanols and, in particular, select alkoxysilane cluster compounds prepared therefrom.

The subject trialkoxysilanols and alkoxysilane cluster compounds are known in the art and their structure and preparation are described in detail in commonly assigned U.S. Pat. No. 3,965,136 (Knollmueller). The disclosure of this reference is hereby incorporated by reference in its entirety. The alkoxysilane compounds of the present invention are silicon-oxygen balanced cluster compounds. The utility of these cluster compounds as hydraulic and heat transfer fluids is described in commonly assigned U.S. Pat. No. 4,048,084 (Knollmueller).

The trialkoxysilanols are represented by the formula:

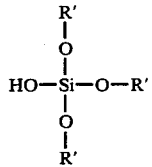

I wherein each R' is independently selected from hydrogen, an alkyl, alkenyl, aryl or aralkyl, with the proviso that at least a majority of the R' radicals are sterically hindered alkyl groups having at least 3 carbon atoms. Subject to this proviso, R' preferably is hydrogen, an alkyl or alkenyl having about 1 to about 18 carbon atoms or an aryl or aralkyl having about 6 to about 14 carbon atoms. In accordance with the above proviso, at least a majority of the R' radicals are sterically hindered alkyl groups having about 3 to about 24 carbon atoms and preferably are sterically hindered alkyl groups having about 4 to about 12 carbon atoms. By sterically hindered alkyl groups is meant alkyl radicals which contribute to the hydrolytic stability of the molecule, i.e., which inhibit the reaction of water with the silicon-oxygen or the carbon-oxygen bonds in the molecule. Examples of sterically hindered alkyl radicals are non-linear primary alkyl radicals having a beta position side chain of at least 2 carbon atoms, secondary alkyl radicals and tertiary alkyl radicals. Particularly useful sterically hindered alkyl groups include sec. butyl, isobutyl, 2-ethyl butyl, 2-ethyl pentyl, 3-ethyl pentyl, 2-ethyl hexyl, 3-ethyl hexyl, 2,4-dimethyl-3-pentyl, and the like.

The alkoxysilane cluster compounds feature the formula:

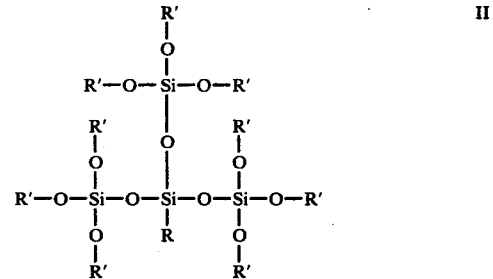

II wherein R is hydrogen, an alkyl, alkenyl, aryl or aralkyl and each R' is independently selected from the same group as R, with the proviso that at least a majority of R' radicals attached to each Si atom are sterically hindered alkyl groups having at least 3 carbon atoms. This general Formula II may also be written in an abbreviated form as RSi[OSi(OR')$_3$]$_3$ wherein R and R' are as defined. Desirably R is hydrogen, an alkyl or alkenyl having about 1 to about 18 carbon atoms or an aryl or aralkyl having about 6 to about 24 carbon atoms. Preferably R is hydrogen, an alkyl having about 1 to about 8 carbon atoms or an aryl or aralkyl having about 6 to about 14 carbon atoms. In Formula II, each R' is independently selected from the same group as R, with the proviso that at least a majority of the R' radicals on each Si atom are sterically hindered alkyl groups having at least 3 carbon atoms. The desired and preferred groups for R' are the same as for R, subject to the preceding proviso. Desirably, at least a majority of the R' radicals are sterically hindered alkyl groups having about 3 to about 24 carbon atoms and preferably are sterically hindered alkyl groups having about 4 to about 12 carbon atoms. By sterically hindered alkyl groups is meant alkyl radicals which contribute to the hydrolytic stability of the molecule, i.e., which inhibit the reaction of water with the silicon-oxygen or the carbon-oxygen bonds in the molecule. Exemplary of sterically hindered alkyl radicals are non-linear primary alkyl radicals having a beta position side chain of at least 2 carbon atoms, secondary alkyl radicals and tertiary alkyl radicals. Particularly useful sterically hindered alkyl groups include sec. butyl, isobutyl, 2-ethyl butyl, 2-ethyl pentyl, 3-ethyl pentyl, 2-ethyl hexyl, 3-ethyl hexyl, 2,4-dimethyl-3-pentyl, and the like.

In the preferred method of preparing the novel alkoxysilane cluster compounds of the present invention, a trihalosilane is reacted with a trialkoxysilanol in the presence of a hydrogen halide acceptor base, and optionally a solvent, to obtain a cluster compound containing product.

The trihalosilane used in forming the halogenated alkoxysilane cluster compound reactant used in the present invention is a substituted trihalosilane of the general formula:

$$\text{III} \quad R\text{-}SiX_3$$

wherein R is hydrogen, an alkyl, alkenyl, aryl or aralkyl group. Preferably, R is hydrogen, an alkyl or alkenyl having about 1 to about 18 carbon atoms or an aryl or aralkyl having about 6 to about 24 carbon atoms. Most preferably, R is hydrogen, an alkyl or alkenyl having about 1 to about 8 carbon atoms or an aryl or aralkyl having aobut 6 to about 14 carbon atoms. The X groups are halogen groups independently selected from F, Cl, Br and I; preferably selected from Cl, Br and I. Most preferred is a trihalosilane reactant wherein X is Cl.

The trialkoxysilanol used in forming the alkoxysilane cluster compound is represented by Formula I, above,

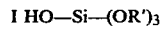
$$\text{I} \quad HO\text{—}Si\text{—}(OR')_3$$

wherein R' is as defined.

The acceptor base compound may be any compound which will accept hydrogen halide and thereby promote the formation of the intermediates and the cluster compounds of the present invention. Among the preferred acceptor bases are the nitrogenated tertiary organic base compounds having at least 3 carbon atoms, e.g., the lower alkyl and aryl tertiary amines such as triethylamine, tributylamine, as well as pyridine, substituted pyridine, N,N'-dimethylaniline and the like. Pyridine is particularly preferred.

It is preferred to conduct the alkoxysilane cluster-forming reaction in a solvent medium, in order to moderate the rate of the reaction and accommodate the post-reaction separation of the acceptor base hydrohalide from the product. The solvent medium may be any non-protonic solvent which does not interfere with the reaction. In addition, the reactants (Formulae I and III and the acceptor base) must be soluble in the chosen solvent, and the acceptor base hydrohalide must be insoluble in the medium to facilitate its removal from the product. Preferred solvents include benzene, toluene, xylene, hexane, heptane, high-boiling petroleum ethers, and other ethers such as tetrahydrofuran, dioxane and the like. Aliphatic solvents, such as hexane and heptane, are particularly preferred.

A particularly preferred method of preparing these alkoxysilane cluster compounds is disclosed in commonly assigned U.S. Pat. No. 4,077,993 (Knollmueller), the disclosure of which is hereby incorporated in its entirety by reference.

The trialkoxysilanols and alkoxysilane cluster compounds, according to the present invention, have been found to be particularly useful as surfactant compositions for use in rigid polyurethane foam formulations. The subject surfactant compositions exhibit favorable hydrolytic stability properties and the use of these surface active agents results in rigid foams with good, uniform cell structures.

Pursuant to this invention, rigid polyurethane foam is prepared from a foam-forming reaction mixture containing the surfactant composition described above. In preparing th polyurethane foam, either the so-called "one-shot method" or the "prepolymer technique" may be employed. Any combination of polyols, including polyether polyols and polyester polyols, organic polyisocyanate, foaming agent, catalyst and other reactants capable of forming a rigid polyurethane foam can be employed. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in preparing the foam, the polyether polyols are preferred. Any suitable polyether polyols may be used for this purpose. These polyether polyols usually have a hydroxyl number, for example, from about 25 to about 800.

The polyether polyols include, for example, oxyalkylated polyhydric alcohols having a molecular weight range of about 200-10,000 and preferably between about 250-8,000. These oxyalkylated polyhydric alcohols are generally prepared by methods well known in the art such as by reacting, in the presence of an alkaline catalyst, a polyhydric alcohol and an alkylene oxide such as ethylene oxide, propylene oxide, butylene oxide, amylene oxide, epichlorohydrin, and mixtures of these alkyene oxides, using either random or step-wise addition.

Polyhydric alcohols suitable for use in preparing the polyether polyols include, for example, ethylene glycol, propylene glycol, 2,3-butylene glycol, 1,3-butylene glycol, 1,5-pentane diol, 1,6-hexane diol, glycerol, trimethylolpropane, sorbitol, pentaerythritol, methyl glucoside, sucrose, dextrose, mixtures thereof and the like. If desired, a portion or all of the polyhydric alcohol may be replaced with another compound having at least 2 reactive hydrogen atoms, such as the alkyl amines, the alkylene polyamines, the cyclic amines, the amides, and the polycarboxylic acids. Suitable alkyl amines and alkylene polyamines include methylamine, ethylamine, propylamine, butylamine, hexylamine, ethylenediamine, 1,6-hexandiamine, diethylenetriamine, and the like. The cyclic amines are exemplified by piperzine, 2-methylpiperazine and 2,5-dimethylpiperazine; the amides are exemplified by acetamide, succinamide and benzenesulfonamide, and illustrative polycarboxylic acids include adipic acid, succinic acid, glutaric acid, azelaic acid, diglycollic acid, and the like.

The organic polyisocyanates used in the preparation of the polyurethane foams include, for example, toluene diisocyanate, such as the 80:20 and the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polymethylene polyphenylisocyanate, mixtures thereof and the like. The preferred organic polyisocyanate is toluene diisocyanate. The amount of isocyanate employed in the process of this invention should be sufficient to provide at least about 0.7, and preferably about 0.9-1.20, NCO groups per hydroxyl group present in the reaction system.

The polyurethane foams are prepared in the presence of a foaming agent which may be any of those known to be useful for this purpose. Illustrative are water and organic foaming agents containing up to about 7 carbon atoms such as the halogenated hydrocarbons, lower molecular weight alkanes, ethers, and mixtures thereof. Typical halogenated hydrocarbons include, but are not limited to, monofluorotrichloromethane, dichlorofluoromethane, diflurodichloromethane, 1,1,2-trichloro- 1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to about 50, and preferably about 5-35, parts per 100 parts by weight of the polyol, and generally water is employed in an amount from about 1 to about 6 parts by weight per 100 parts weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts, and mixtures thereof. Typical tertiary amines include, but are not limited to, N-ethyl morpholine, N-hydroxyethyl morpholine, triethylene diamine, triethylamine, and trimethylamine. Typical metallic salts include, for example, the salts of antimony, tin and iron, e.g., dibutyltin dilaurate, stannous octoate, and the like. Any catalytic porportion of catalyst or catalyst mixture may be employed such as from about 0.1 to about 3.0 percent, and preferably from about 0.5 to about 2.5 percent, by weight of the polyol.

In preparing polyurethane foams in accordance with this invention, any suitable proprortion of surfactant composition described above may be used which is effective in stabilizing the foam and providing other desirable cell and foam characteristics without otherwise interfering with the foaming reaction or materially altering the properties of the resulting foam. For example, from about 0.01 to about 5.0 parts by weight of surfactant are employed per 100 parts of polyol. Preferably, the amount of surfactant used is from about 0.25 to about 3.0 parts by weight per 100 parts of polyol.

Various additives may also be included in the foam-forming reaction mixture which serve to provide different properties in the polyurethane foam. For example, fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants, antioxidants and flame retardants may be added.

In the practice of this invention, a polyurethane foam-forming reaction mixture comprising the above-described ingredients is fed to a suitable reaction zone such as by pouring into a suitable mold or onto a moving conveyor belt where reaction proceeds. The foaming reaction is exothermic, and auxilary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bring about the formation of an uncured cellular gel material which usually cures fairly rapidly at room temperature. Once cured, the foam will be ready for use in various packaging and insulating applications.

The following examples are provided to illustrate the invention. All parts and percentages given in these examples are by weight unless otherwise specified.

COMPARATIVE EXAMPLE I

A rigid polyurethane foam was prepared from a reaction mixture consisting of the ingredients listed below, in the indicated proportions. The ingredients were handmixed and foamed in a square cardboard box.

| Component | Parts By Weight |
| --- | --- |
| Polyol A[1] | 100 |
| Polyol B[2] | 20 |
| Blowing Agent[3] | 38 |
| Amine Catalyst[4] | 2.0 |
| Isocyanate[5] | 132.9 |

[1]This is a 360 hydroxyl number polyether polyol prepared by condensing, in the presence of boron trifluoride etherate catalyst, 4,4,4-trichloro-1,2-epoxybutane with an equimolar mixture of ethylene glycol and α-d-glucose monohydrate.
[2]This is a 600 hydroxyl number polyether polyol prepared by condensing ethylene oxide with diethanolamine.
[3]This is a trichlorofluoromethane blowing agent available from duPont under the trademark"Freon R11-B".
[4]This is a dimethylcyclohexylamine catalyst commercially available from Abbott Labs under the trademark "Polycat 8".
[5]This is a polymethylene polyphenylisocyanate having a functionality of 2.6, available commercially from Upjohn Company under the trademark"PAPI 135".

EXAMPLES II AND III

Rigid polyurethane foams were prepared according to the general procedure outlined in Comparative Example I and using the same ingredients and proportions listed, but including a surfactant composition in accordance to the present invention. The foam formulation of Example II included 2.0 PBW of a trialkoxysilanol having the formula $HOSi(OC_4H_9 \text{ sec.})_3$. The foam formulation of Example III included 1.5 PBW of an alkoxysilane cluster compound of the formula $CH_3Si[OSi(OC_4H_9 \text{ sec.})_3]_3$.

COMPARATIVE EXAMPLE IV

A rigid polyurethane foam was prepared according to the general method of Example I, but including 1.5 PBW of a commonly used silicone-glycol copolymer surfactant obtained from Dow Corning under the trademark "Dow Corning 193 Surfactant".

As described in the above Examples, the indicated proportions of the ingredients were mixed together and then foamed in a cardboard box. Using a stop-watch, the processing times ("cream" time, "rise" time, "gel" time and "tack free" time) were noted and recorded. The foams were then visually inspected for friability and cell structure. The processing data and physical evaluations are listed below in Table A. Without any surfactant, the resulting foam exhibited many large irregular cells. Using the surfactant compositions of the present invention resulted in favorable foams with good cell structure and friability (comparable to the properties accomplished with the common commercial surfactant of Comparative Example IV).

Table A

| Sample | Cream | Rise | Gel | Tack Free | |
| --- | --- | --- | --- | --- | --- |
| Comparative Example I | 13 | 58 | 35 | 45 | Unacceptable Many Large Cells |
| Example II | 11 | 58 | 31 | 45 | Good Cell Structure and Friability |
| Example III | 11 | 57 | 31 | 45 | Good cell Structure and Friability |
| Comparative Example IV | 10 | 55 | 30 | 43 | Good Cell Structure and |

Table A-continued

| Sample | Cream | Rise | Gel | Tack Free |
|---|---|---|---|---|
| | | | | Friability |

What is claimed is:

1. In a process for producing a rigid polyurethane foam from a reaction formulation comprising a polyol, an organic polyisocyanate, a foaming agent and a catalyst, the improvement characterized by adding an effective proportion of a surfactant composition having the formula:

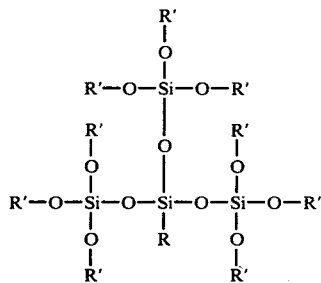

wherein R is hydrogen, an alkyl, alkenyl, aryl or aralkyl, and each R' is independently selected from the same group as R, with the proviso that at least a majority of R' radicals on each Si atom are sterically hindered alkyl groups having at least 3 carbon atoms.

2. The process of claim 1 wherein R is hydrogen, an alkyl or alkenyl having about 1 to about 18 carbon atoms or an aryl or aralkyl having about 6 to about 24 carbon atoms and wherein each R' is independently selected from the same group as R, subject to the above proviso.

3. The process of claim 2 wherein a majority of the R' radicals are sterically hindered alkyl groups having about 3 to about 24 carbon atoms.

4. The process of claim 1 wherein R is hydrogen, an alkyl having about 1 to about 8 carbon atoms or an aryl or aralkyl having about 6 to about 14 carbon atoms and wherein each R' is independently selected from the same group as R, subject to the above proviso.

5. The process of claim 4 wherein a majority of the R' radicals are sterically hindered alkyl groups having about 4 to about 12 carbon atoms.

6. The process of claim 1 wherein a majority of the R' radicals are sterically hindered alkyl groups having about 3 to about 24 carbon atoms.

7. The process of claim 6 wherein a majority of the R' radicals are sterically hindered alkyl groups having about 4 to about 12 carbon atoms.

8. The process of claim 1 wherein the surfactant is added in a proportion ranging from about 0.01 to about 5.0 parts by weight per 100 parts of polyol.

9. The process of claim 8 wherein the surfactant is added in a proportion ranging from about 0.25 to about 3.0 parts by weight per 100 parts of polyol.

10. The process of claim 8 wherein all of the R' radicals are secondary butyl groups and the R group is methyl.

11. In a process for producing a rigid polyurethane foam from a reaction formulation comprising a polyol, an organic polyisocyanate, a foaming agent and a catalyst, the improvement characterized by adding an effective proportion of a surfactant composition having the formula:

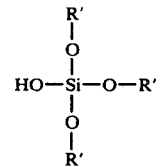

wherein each R' is independently selected from hydrogen, alkyl, alkenyl, aryl or aralkyl, with the proviso that at least two of the R' groups are sterically hindered alkyl groups having at least 3 carbon atoms.

12. The process of claim 11 wherein R' is selected from hydrogen, alkyl or alkenyl having 1 to about 18 carbon atoms or aryl or aralkyl having about 6 to about 24 carbon atoms.

13. The process of claim 12 wherein at least two of the R' groups are sterically hindered alkyl groups having about 3 to about 24 carbon atoms.

14. The process of claim 1 wherein R' is hydrogen, an alkyl having 1 to about 8 carbon atoms, or an aryl or aralkyl having about 6 to about 14 carbon atoms.

15. The process of claim 14 wherein at least two of the R' radicals are sterically hindered alkyl groups having about 4 to about 12 carbon atoms.

16. The process of claim 11 wherein the surfactant is added in a proportion ranging from about 0.01 to about 5.0 parts by weight per 100 parts of polyol.

17. The process of claim 16 wherein the surfactant is added in a proportion ranging from about 0.25 to about 3.0 parts by weight per 100 parts of polyol.

18. The process of claim 16 wherein all of the R' radicals are secondary butyl groups.

19. A rigid polyurethane foam produced according to the method of claim 1.

20. A rigid polyurethane foam produced according to the method of claim 10.

21. A rigid polyurethane foam produced according to the method of claim 11.

22. A rigid polyurethane foam produced according to the method of claim 18.

23. A polyol composition for reaction with an organic polyisocyanate for the production of a rigid polyurethane foam, comprising a polyol selected from polyether and polyester polyols and an effective proportion of a surfactant having the formula:

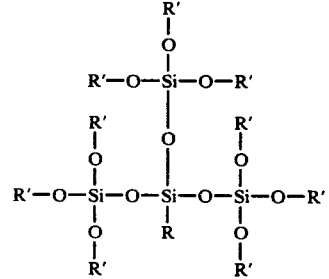

wherein R is hydrogen, an alkyl, alkenyl, aryl or aralkyl, and each R' is independently selected from the same group as R, with the proviso that at least a majority of R' radicals on each Si atom are sterically hindered alkyl groups having at least 3 carbon atoms.

24. The polyol composition of claim 23 comprising a polyether polyol and a surfactant wherein all of the R' radicals are secondary butyl groups and the R group is methyl.

25. A polyol composition for reaction with an organic polyisocyanate for the production of a rigid polyurethane foam, comprising a polyol selected from polyether and polyester polyols and an effective proportion of a surfactant having the formula:

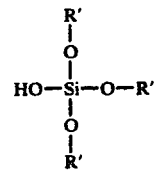

wherein each R' is independently selected from hydrogen, alkyl, alkenyl, aryl or aralkyl, with the proviso that at least two of the R' groups are sterically hindered alkyl groups having at least 3 carbon atoms.

26. The polyol composition of claim 25 comprising a polyether polyol and a surfactant wherein all of the R' radicals are secondary butyl groups.

* * * * *